US008561046B2

(12) United States Patent
Song et al.

(10) Patent No.: US 8,561,046 B2
(45) Date of Patent: Oct. 15, 2013

(54) PIPELINED PARALLELIZATION WITH LOCALIZED SELF-HELPER THREADING

(75) Inventors: Yonghong Song, Palo Alto, CA (US); Spiros Kalogeropulos, Los Gatos, CA (US); Partha P. Tirumalai, Fremont, CA (US)

(73) Assignee: Oracle America, Inc., Redwood City, CA (US)

( * ) Notice: Subject to any disclaimer, the term of this patent is extended or adjusted under 35 U.S.C. 154(b) by 1006 days.

(21) Appl. No.: 12/559,167

(22) Filed: Sep. 14, 2009

(65) Prior Publication Data

US 2011/0067014 A1  Mar. 17, 2011

(51) Int. Cl.
*G06F 9/45* (2006.01)

(52) U.S. Cl.
USPC .......................................................... 717/161

(58) Field of Classification Search
USPC .......................................................... 717/161
See application file for complete search history.

(56) References Cited

U.S. PATENT DOCUMENTS

| | | | |
|---|---|---|---|
| 6,651,246 B1 | 11/2003 | Archambault et al. | |
| 6,654,954 B1 | 11/2003 | Hicks | |
| 6,880,045 B2 | 4/2005 | Pong et al. | |
| 6,938,130 B2 | 8/2005 | Jacobson et al. | |
| 7,395,531 B2 | 7/2008 | Eichenberger et al. | |
| 7,426,724 B2 | 9/2008 | Kilgard et al. | |
| 7,530,069 B2 | 5/2009 | Kawahara et al. | |
| 7,543,282 B2 | 6/2009 | Chou | |
| 7,818,729 B1 | 10/2010 | Plum et al. | |
| 7,853,934 B2 | 12/2010 | Partamian | |
| 2003/0079116 A1 | 4/2003 | Chaudlhry et al. | |
| 2004/0049667 A1 | 3/2004 | McCormick, Jr. et al. | |
| 2005/0071841 A1* | 3/2005 | Hoflehner et al. | 718/100 |
| 2005/0081207 A1* | 4/2005 | Hoflehner et al. | 718/100 |
| 2006/0026575 A1 | 2/2006 | Cabillic et al. | |
| 2006/0026580 A1 | 2/2006 | Cabillic et al. | |
| 2007/0022422 A1* | 1/2007 | Tirumalai et al. | 718/100 |
| 2007/0050762 A1 | 3/2007 | Chen et al. | |
| 2008/0163185 A1 | 7/2008 | Goodman | |

OTHER PUBLICATIONS

Jung et al., "Helper Thread Prefetching for Loosely-Coupled Multi-processor Systems," IEEE, 2006, 10pg.*
Tan et al., "A Parallel Dynamic Programming Algorithm on a Multi-core Architecture," ACM, 2007, 10pg.*
Song, Y., et al; "Design and Implementation of a Compiler Framework for Helper Threading on Multi-Core Processors," IEEE PACT 2005, (Sep. 2005); pp. 99-109.

(Continued)

*Primary Examiner* — Li B Zhen
*Assistant Examiner* — Ryan Coyer
(74) *Attorney, Agent, or Firm* — Rory D. Rankin; Meyertons, Hood, Kivlin, Kowert & Goetzel, P.C.

(57) ABSTRACT

A system and method for automatically parallelizing a computer program for multi-threaded execution. A compiler identifies and parallelizes non-DOALL parallel regions, such as loops, within a computer program. The compiler determines enhanced helper thread instructions based upon the main body instructions of the non-DOALL region. These helper thread instructions are inserted ahead of the main body instructions within each of the plurality of threads, rather than within a single main thread. Next, synchronization instructions are inserted in one or more threads such that the main body of work of each thread is performed in a pipelined manner. The helper thread instructions within each thread may reduce the total execution time of each thread.

20 Claims, 11 Drawing Sheets

(56) References Cited

OTHER PUBLICATIONS

Damron, P., et al; "Hybrid Transactional Memory"; ASPLOS XII; San Jose, CA (2006); http://www.princeton.edu/~asplos06/tprogram.html.

Su, E., et al; "Compiler Support of the Workqueuing Execution Model for Intel SMP Architectures"; Fourth European Workshop on OpenMP (EWOMP), (2002).

Zhong, H., et al; "Uncovering Hidden Loop Level Parallelism in Sequential Applications"; In Proc. of the 14th International Symposium on High-Performance Computer Architecture; (2008).

"Design and Evaluation of Dynamic Optimizations for a Java Just-in-Time Compiler", Suganuma, et al., Jul. 2005, pp. 732-785, http://delivery.acm.org/10.1145/1080000/1075386/p732-suganuma.pdf.

"Compiler Optimization of Embedded Applications for an Adaptive SoC Architecture", Hardnett, et al., Oct. 2006, pp. 312-322, http://delivery.acm.org/10.1145/1180000/1176798/p312-hardnett.pdf.

"Dynamic Code Management: Improving Whole Program Code Locality in Managed Runtimes", Huang, et al., Jun. 2006, pp. 133-143, http://delivery.acm.org/10.1145/1140000/1134779/p133-huang.pdf.

"ACME: Adaptive Compilation Made Efficient", Cooper, et al., Jul. 2005, pp. 69-77, http://delivery.acm.org/10.1145/1070000/1065921/p69-cooper.pdf.

\* cited by examiner

Inter-Thread Dependences 700

Code 710

```
for (t = 0; t < n; t++) {
    if (a[t] == 0) {
        k = k + const_c;
        ... b[k] ...
    }
}
```

Code 720

<wait for preparatory work section 610
of previous "j-1" thread to complete>

/* now the value of the variable "k" is
available as start_k */

```
k = start_k;
for (t = start_j; t <= end_j; t++) {
    if (a[t] == 0) {
        k = k + const_c;
        prefetch (&(b[k]));
    }
}
```

<wait for application work section 620 of
previous "j-1" thread to complete>

```
k = start_k;
for (t = start_j; t <= end_j; t++) {
    if (a[t] == 0) continue;
    k = k + const_c;
    ... b[k] ...
}
```

FIG. 7A

Inter-Thread Dependences 750

Code 752a

<if previous thread "j-1" is a main thread, wait for the corresponding application work section 620 to begin>

<else if previous thread "j-1" is a non-main thread, wait for the corresponding preparatory work section 610 to begin> start_k = <the correct input "k" value for thread "j-1">
for (t=start_{j-1}; t <= end_{j-1}; t++) {
    if (a[t] == 0) {
        start_k = start_k + const_c;
    }
}
/* now start_k is the correct input value for variable "k" in non-main thread "j" */

<signal to non-main thread "j+1" that the correct input value for variable "k" for non-main thread "j" is available>

Code 752b

/* now execute the preparatory work section 610 for non-main thread "j" */
k = start_k;
for (t = start_j; t <= end_j; t++) {
    if (a[t] == 0) {
        k = k + const_c;
        prefetch (&(b[k]));
    }
}

<wait for the application work section 620 of the previous non-main thread "j-1" thread to complete> k = start_k;
for (t = start_j; t <= end_j; t++) {
    if (a[t] == 0) {
        k = k + const_c;
        ... b[k] ...
    }
}

FIG. 7B

PIPELINED PARALLELIZATION WITH LOCALIZED SELF-HELPER THREADING

BACKGROUND OF THE INVENTION

1. Field of the Invention

This invention relates to computer systems, and more particularly, to providing an efficient method of automatically parallelizing a computer program for simultaneous execution using multiple threads.

2. Description of the Relevant Art

The performance of computer systems is dependent on both hardware and software. Parallel systems, such as multi-threaded processor machines, are increasingly common. Two trends are broadening this usage pattern from systems for a specialized community of engineers and scientists to commonplace desktop systems. First, due to the reduction in geometric dimensions of devices and metal routes on-chip, it is common to have larger caches, multi-threading capability on processor cores, multiple cores on-chip, and special-purpose accelerators such as digital signal processors (DSPs) or cryptographic engines on-chip. These systems will have lots of hardware threads but are not expected to run at much higher clock frequencies. Second, techniques for automatic parallelization have been advancing. These capabilities may increase system performance by simultaneously executing multiple processes, and corresponding multiple threads.

The extent to which available hardware parallelism can be exploited is directly dependent on the amount of parallelism inherent in a given software application. In addition to advances in hardware design, advances in compiler design attempt to extract further parallelism available in applications to reduce inefficient code execution. Automatic parallelization has been well studied in the past. Automatic parallelization seeks to parallelize sequential programs such that the resulting executable(s) may have improved performance on multi-threaded machines. Little or no parallelization effort is required from the user as most of the work is done by the compiler and an accompanying runtime library.

One optimization that may be performed by the compiler is augmenting the source code with additional instructions at a location in the code before an identified parallel region. Identifying a parallel region may comprise detecting one or more of the following: a "for" or "while" loop construct, a user-specified directive such as an OpenMP pragma, a first function call with no data dependencies on a second function call, and a first basic block with no data dependencies on a second basic block.

Modern automatic parallelization techniques parallelize a loop construct if the compiler is certain that all loop iterations can be executed simultaneously. Such loops may be referred to as DOALL loops. A loop can be executed in fully parallel form, without synchronization, if the desired outcome of the loop does not depend upon the execution ordering of the data accesses from different iterations. In order to determine whether or not the execution order of the data accesses affects the semantics of the loop, the data dependence relations between the statements in the loop body must be analyzed.

After dependence analysis and loops are generally categorized as either DOALL loops or non-DOALL loops, modern automatic parallelization techniques may be used on the DOALL loops. In order to extract further thread level parallelism (TLP) from an application, subsequent techniques may be used to attempt to parallelize the non-DOALL loops despite cross-iteration dependences. Examples include helper threading and speculative automatic parallelization.

Regarding the first example, in helper threading, a helper thread executes an abbreviated version of an original loop on a different hardware thread that may provide preparatory work ahead of the actual execution work of loops. For example, memory reference address calculations and prefetching of data may occur ahead of the execution of the work to perform an algorithm or method of the loop. A separate helper thread and the main thread typically share at least one level of the cache. The helper thread attempts to prefetch data into the shared cache in order that the main thread retrieves data directly from the shared cache without accessing a lower-level memory due to misses to the shared cache. An example of helper threading is provided in Y. Song et al., Design and Implementation of a Compiler Framework for Helper Threading on Multi-core Processors, IEEE PACT, 2005, pp. 99-109.

Regarding the second example, in speculative automatic parallelization, hardware transactional memory support may be used such as the underlying hardware's checkpoint/commit capability to speculatively execute a loop. Again, the loop iterations may be divided among the main thread and non-main threads. Each non-main thread will speculatively execute the loop body, wherein the loop body is encapsulated inside a checkpoint/commit region. A transaction failure will trigger either retries of the same speculative execution, or waiting to execute the work non-speculatively after the previous logical thread has completed its work. This technique may utilize additional hardware support to detect a transaction failure and trigger suitable remedial action.

In order to further extract TLP from software applications and increase system performance of multi-threaded architectures, a method may be desired that performs further preparatory work of each of the main and non-main threads with reduced design complexity and overhead to monitor and manage conflicts. Also, a method may be desired that increases system throughput by sequential in-program order execution of threads of non-DOALL loops without additional hardware support for detecting transaction failures of speculatively executed iterations of non-DOALL loops. In view of the above, efficient methods and mechanisms for automatically controlling run-time parallelization of a software application are desired.

SUMMARY OF THE INVENTION

Systems and methods for automatically parallelizing a computer program for simultaneous execution using multiple threads are contemplated.

In one embodiment, a compiler comprises optimization instructions that identify non-DOALL parallel regions, such as loops, within a computer program. These non-DOALL regions have detectable cross-iteration dependences or cannot be proved to not have such dependences. The compiler partitions the non-DOALL regions and distributes the work and corresponding data to a plurality of software threads. In addition, the compiler determines helper thread instructions based upon the instructions of the main body within the region. These helper thread instructions are inserted ahead of the main body instructions within each of the plurality of threads, rather than within a single main thread.

Next, synchronization instructions are inserted in one or more of the plurality of threads in order that the main body of instructions within each of the plurality of threads is executed in program order with respect to each other thread of the plurality of threads. In other words, the main body of work of each thread is performed in a pipelined parallelized manner. The helper thread instructions within each thread may reduce the total execution time of the thread. Therefore, the non-DOALL parallel regions may be executed non-speculatively, but faster than unaided sequential in program order execution.

BRIEF DESCRIPTION OF THE DRAWINGS

FIG. 7A is a generalized block diagram illustrating one embodiment of inter-thread dependences within a preparatory work section of a thread.

FIG. 7B is a generalized block diagram illustrating another embodiment of inter-thread dependences within a preparatory work section of a thread.

Figure 1:
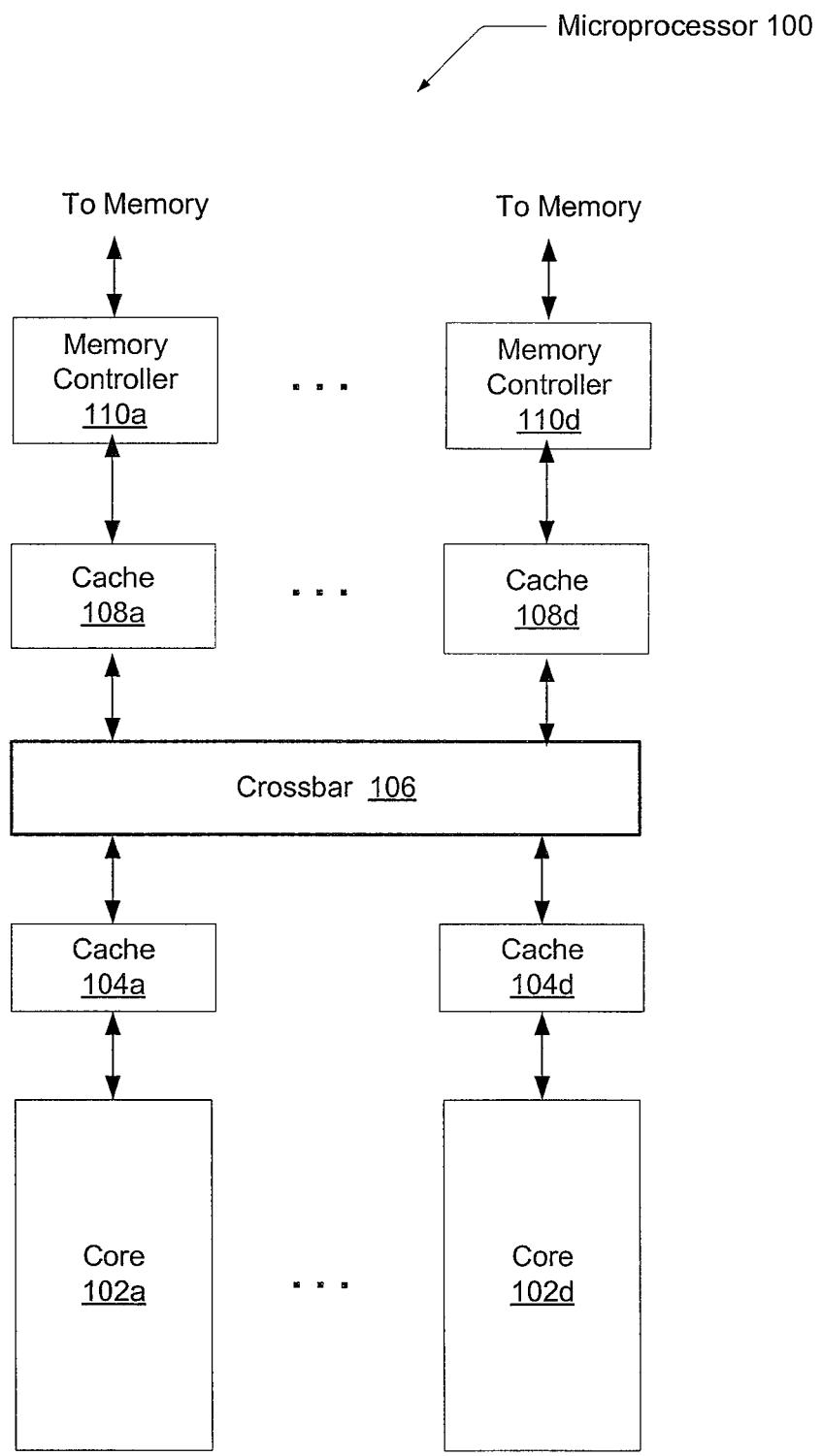
FIG. 1 is a generalized block diagram illustrating one embodiment of a multi-core microprocessor.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Referring to FIG. 1, one embodiment of a multi-core microprocessor 100 is shown. Microprocessor 100 may have multiple cores 102a-102d. As used herein, elements referred to by a reference numeral followed by a letter may be collectively referred to by the numeral alone. For example, cores 102a-102d may be collectively referred to as cores 102. Each core 102 may include a superscalar microarchitecture with one or more multi-stage pipelines. Each core 102 may be configured to execute instructions of software applications corresponding to an instruction set architecture (ISA) such as x86, SPARC, PowerPC, MIPS, ARM, or other. Also, each core 102 may be designed to execute multiple strands, or threads. For example, a multi-thread software application may have each of its software threads scheduled to be executed on a separate pipeline within a core 102, or alternatively, a pipeline may process multiple threads via control at certain function units. Each core 102 may comprise a first-level cache or in other embodiments, the first-level cache 104 may be outside the core 102.

A crossbar 106 may be used to connect each core 102 and first-level cache 104 to shared resources such as second-level caches 108 and lower-level memory via memory controllers 110. Interfaces between crossbar 106 and the different levels of caches 104 and 108 may comprise any suitable technology. In other embodiments, other levels of caches may be present between cache 108 and memory controller 110. Also, an I/O bus adapter, not shown, may be coupled to crossbar 106 to provide an interface for I/O devices to caches 104 and 108 and cores 102. In another embodiment, an I/O interface may be implemented in memory controller 110. Memory controllers 110 may be coupled to lower-level memory, which may include other levels of cache on the die outside the microprocessor, dynamic random access memory (DRAM), dual in-line memory modules (dimms) in order to bank the DRAM, a hard disk, or a combination of these alternatives. Also, in other embodiments, there may only be a single memory controller 110 on microprocessor 100.

A multi-thread software application may be written by a designer to be executed on a multi-core processor, such as the one in FIG. 1, or on a multi-processor chip. The multi-thread program may be compiled prior to execution on a system such as microprocessor 100. A compiler is a set of programs for translating source code, such as a multi-thread software program, into another computer language, or target code.

Figure 2:
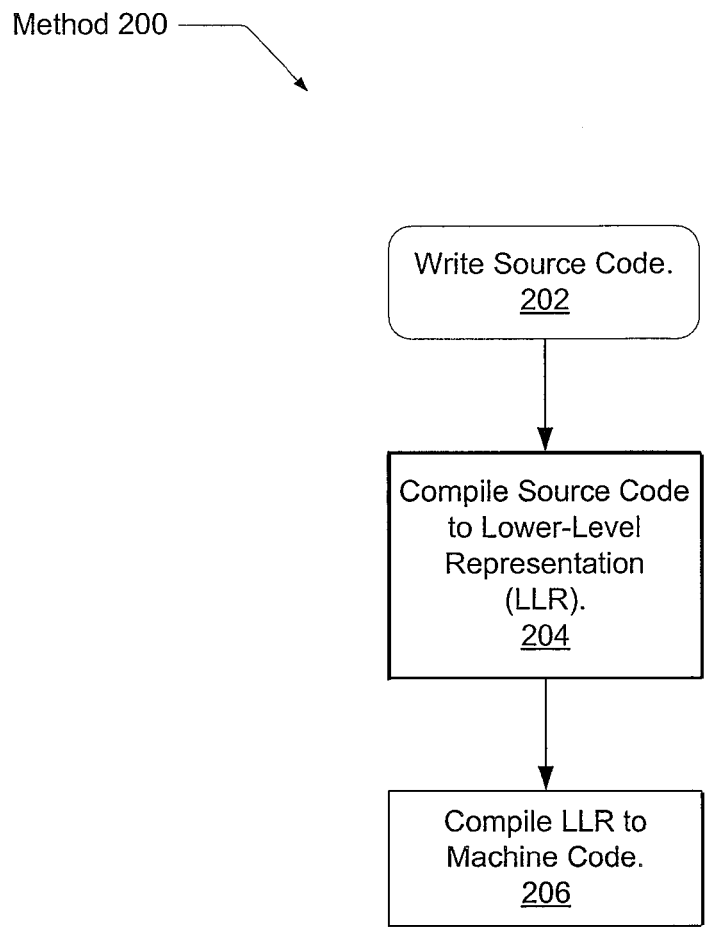
FIG. 2 is a flow diagram illustrating one embodiment of a compiler method.

Referring to FIG. 2, one embodiment of a compiler method 200 is shown. Method 200 may be modified by those skilled in the art in order to derive alternative embodiments. Also, the steps in this embodiment are shown in sequential order. However, some steps may occur in a different order than shown, some steps may be performed concurrently, some steps may be combined with other steps, and some steps may be absent in another embodiment.

Software applications may be written by a designer in a high-level language such as C, C++, Fortran, or other in block 202. This source code may be stored on a computer readable medium. A command instruction, which may be entered at a prompt by a user or placed within a scripting language, with any necessary options may be executed in order to compile the source code.

In block 204, the front-end compilation translates the source code to a lower-level representation. Syntactic and semantic processing as well as some optimization is performed at this step. Most modern compilers may be split into a number of relatively independent phases, or passes. Separate phases allow one or more phases to be later improved or replaced, and additional phases may later be inserted to permit additional optimizations. Although modern compilers have two or more phases, these phases are usually regarded as being part of the front-end or the back-end. There is not a hard boundary of responsibilities between these two phases. An advantage of splitting the front-end of a compiler from the back-end is that front-ends for different languages may be combined with back-ends for different processors. Generally speaking, the front-end performs syntactic and semantic processing and translates the source code to a lower-level of representation.

Optimizations may be performed on the lower-level representation. The independence provided by this representation of the source code from the machine code allows generic optimizations to be shared between versions of the compiler.

In one embodiment, the compilation method is completely static and the lower-level representation is an output of a front-end phase to be further compiled statically into machine code. Machine code is a general term that refers to patterns of bits with different patterns corresponding to different commands, or instructions, to the machine, or processor, and to the operating system. In an alternative embodiment, the compilation method is static upfront wherein the lower-level representation is bytecode to be further compiled dynamically into machine code by a JIT compiler within a virtual machine.

In block 206, the back-end may perform more transformations and optimizations for a particular computer architecture and processor design. A processor may be designed to execute instructions of a particular instruction set architecture (ISA), but the processor may have one or more processor cores. The manner in which a software application is executed in order to reach peak performance may differ greatly between a single-, dual-, or quad-core processor. Thus, the manner in which to compile the software application in order to achieve peak performance may vary between a single-core and a multi-core processor.

One optimization that may be performed at this step is automatic parallelization. A loop with an iteration count that can be determined by a compiler or calculated at execution time before the loop is executed and has an unchanging loop index is referred to as a countable loop. Countable loops may have each loop iteration executed simultaneously. Traditional automatic parallelization attempts to parallelize loops, which do not have cross-iteration dependences, wherein all loop iterations may be executed at the same time. Generally speaking, there are three possible types of dependences between two statements that access the same memory location: flow (read after write, or RAW), anti (write after read, or WAR), and output (write after write, or WAW). Flow dependences are data producer and consumer dependences, since they express a fundamental relationship about the data flow in the program. Anti and output dependences, also known as memory related dependences, are caused by the reuse of memory, such as program variables.

If there are flow dependences between accesses in different iterations of a loop, then the semantics of the loop may not be guaranteed if the loop is executed in fully parallel form. The iterations of such a loop are not independent because values that are computed (produced) in one iteration of the loop are used (consumed) during a later iteration of the loop.

Most automatic parallelization is implemented with a fork join model. The main, or Master, thread will fork a set of N−1 other threads, or slave threads, wherein N is an integer value, such that the work in the parallel loop will be shared amongst all N threads. The thread management and work partitioning tasks are often processed in a separate parallelization library (PL).

The task of spawning and terminating threads, as well as scaling the number of threads according to the number of available processors or processor cores, may be performed by code in a parallelization library (PL). The back-end compiler may expose parallel constructs such as a "for" or a "while" loop by replacing the code in the lower-level representation with method or function calls defined in a PL. These function calls may include a call for a main thread, or a master thread. The main thread includes code to communicate and synchronize with slave threads, or non-main threads.

The PL will apply a scheduling policy, which may be determined and passed in by the back-end compiler, to partition work among multiple threads. As one skilled in the art is aware, there are many different scheduling policies. The most common scheduling policy is called "static" scheduling, which tries to distribute original work evenly across all non-main threads.

Figure 3:
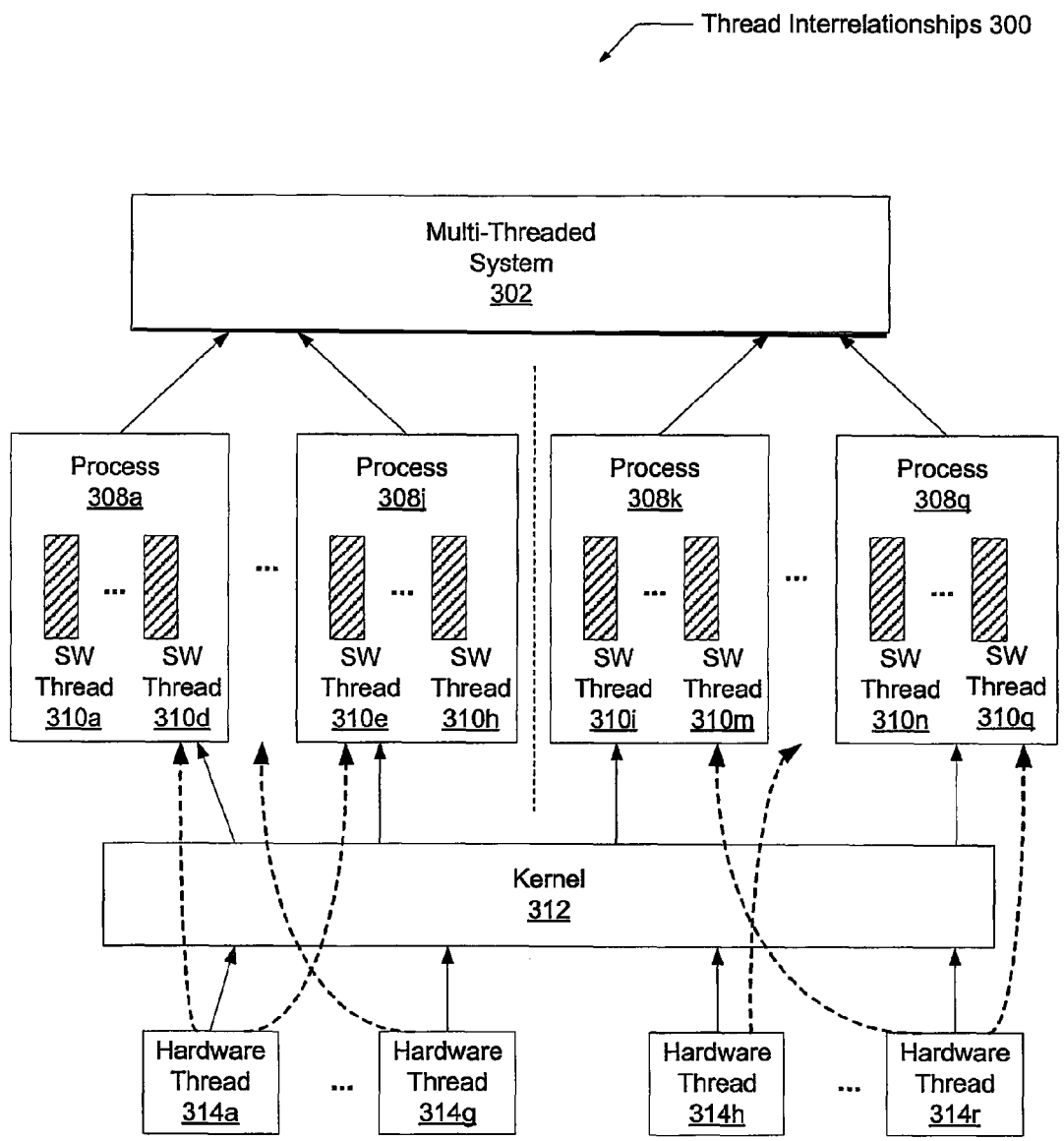
FIG. 3 is a generalized block diagram illustrating one embodiment of hardware and software thread interrelationships.

FIG. 3 illustrates one embodiment of hardware and software thread interrelationships 300 is shown. Here the partitioning of hardware and software resources and their interrelationships during the execution of one or more applications is shown. In one embodiment, the operating system(s) for hardware resources within multi-processor system 302, which may, for example, comprise the resources of microprocessor 100, allocates regions of memory for the hardware resources. This allocation may be performed for subsequent execution of one or more software applications.

When applications, or computer programs, execute, each application may comprise multiple processes, such as Processes 308a-308j and 308k-308q in FIG. 3. In such an embodiment, each process 308 may own its own resources such as an image of memory, or an instance of instructions and data before application execution. Also, each process 308 may comprise process-specific information such as address space that addresses the code, data, and possibly a heap and a stack; variables in data and control registers such as stack pointers, general and floating-point registers, program counter, and otherwise; and operating system descriptors such as stdin, stdout, and otherwise, and security attributes such as process owner and the process' set of permissions.

Multi-processor system 302 typically supports many processes. Within each of the processes 308 may be one or more software threads. For example, Process 308a comprises SW Threads 310a-310d. A thread can execute independent of other threads within its corresponding process and a thread can execute concurrently with other threads within its corresponding process.

Generally speaking, each of the threads 310 belongs to only one of the processes 308. Therefore, for multiple threads of the same process, such as SW Thread 310a-310d of Process 308a, the same data content of a memory line, for example the line of address 0xff38, will be the same for all threads. This assumes the inter-thread communication has been made secure and handles the conflict of a first thread, for example SW Thread 310a, writing a memory line that is read by a second thread, for example SW Thread 310d. However, for multiple threads of different processes, such as SW Thread 310a in Process 308a and SW Thread 310e of Process 308j, the data content of memory line with address 0xff38 will more than likely be different for the threads. However, multiple threads of different processes may see the same data content at a particular address if they are sharing a same portion of address space.

In general, for a given application, kernel 312 sets up an address space for the application, loads the application's code into memory, sets up a stack for the program, branches to a given location inside the application, and begins execution of the application. Kernel 312 may further determine a course of action when insufficient memory is available for the execution of the application. As stated before, an application may be divided into more than one process and system 302 may be running more than one application. Therefore, there may be several processes running in parallel. Kernel 312 may decide at any time which of the simultaneous executing processes should be allocated to the processor(s). Kernel 312 may allow a process to run on a core of a processor, which may have one or more cores, for a predetermined amount of time referred to as a time slice.

In one embodiment, only one process can execute at any time per processor core, CPU thread, or Hardware Thread. In FIG. 3, Hardware Threads 314a-314g and 314h-314r comprise hardware that can handle the execution of the one or more threads 310 within one of the processes 308. This hardware may be a core, such as core 102, or a subset of circuitry within a core 102 configured to execute multiple threads. Microprocessor 100 may comprise one or more cores. Although this hardware resides within a microprocessor 100 which resides within system 302, hardware threads 314 are shown outside of system 302 for illustrative purposes of assignments made by kernel 312. The dashed lines in FIG. 3 denote assignments and do not necessarily denote direct physical connections. Thus, for example, Hardware Thread 314a may be assigned for Process 308a. However, later (e.g., after a context switch), Hardware Thread 314a may be assigned for Process 308j.

In one embodiment, an ID is assigned to each of the Hardware Threads 314. This Hardware Thread ID, not shown in FIG. 3, but is further discussed below, is used to assign one of the Hardware Threads 314 to one of the Processes 308 for process execution. Kernel 312 typically handles this assignment. For example, similar to the above example, a Hardware Thread ID may be used to assign Hardware Thread 314r to Process 308k. This assignment is performed by kernel 312 prior to the execution of any applications.

In one embodiment, system 302 may comprise 4 microprocessors, such as microprocessor 100, wherein each microprocessor may comprise 2 cores, such as cores 102. Then system 302 may be assigned HW Thread IDs 0-7 with IDs 0-1 assigned to the cores of a first microprocessor, IDs 2-3 assigned to the cores of a second microprocessor, etc. HW Thread ID 2, corresponding to one of two cores 102 in a microprocessor 100, may be represented by Hardware Thread 314r in FIG. 3. As discussed above, assignment of a Hardware Thread ID 2 to Hardware Thread 314r may be performed by kernel 312 prior to the execution of any applications. Later, as applications are being executed and processes are being spawned, processes are assigned to a Hardware Thread for process execution. For the soon-to-be executing process, for example, Process 308k in FIG. 3, an earlier assignment performed by kernel 312 may have assigned Hardware Thread 314r, with an associated HW Thread ID 2, to handle the process execution. Therefore, in FIG. 3, a dashed line is shown to symbolically connect Hardware Thread 314r to Process 308k. Accordingly, in this example, one of two cores 102 in a processor may handle the execution of Process 308k.

Later, a context switch may be requested, perhaps due to an end of a time slice. At such a time, Hardware Thread 314r may be re-assigned to Process 308q. In such a case, data and state information of Process 308k is stored by kernel 312 and Process 308k is removed from Hardware Thread 314r. Data and state information of Process 308q may then be restored to Hardware Thread 314r, and process execution resumes.

Figure 4:
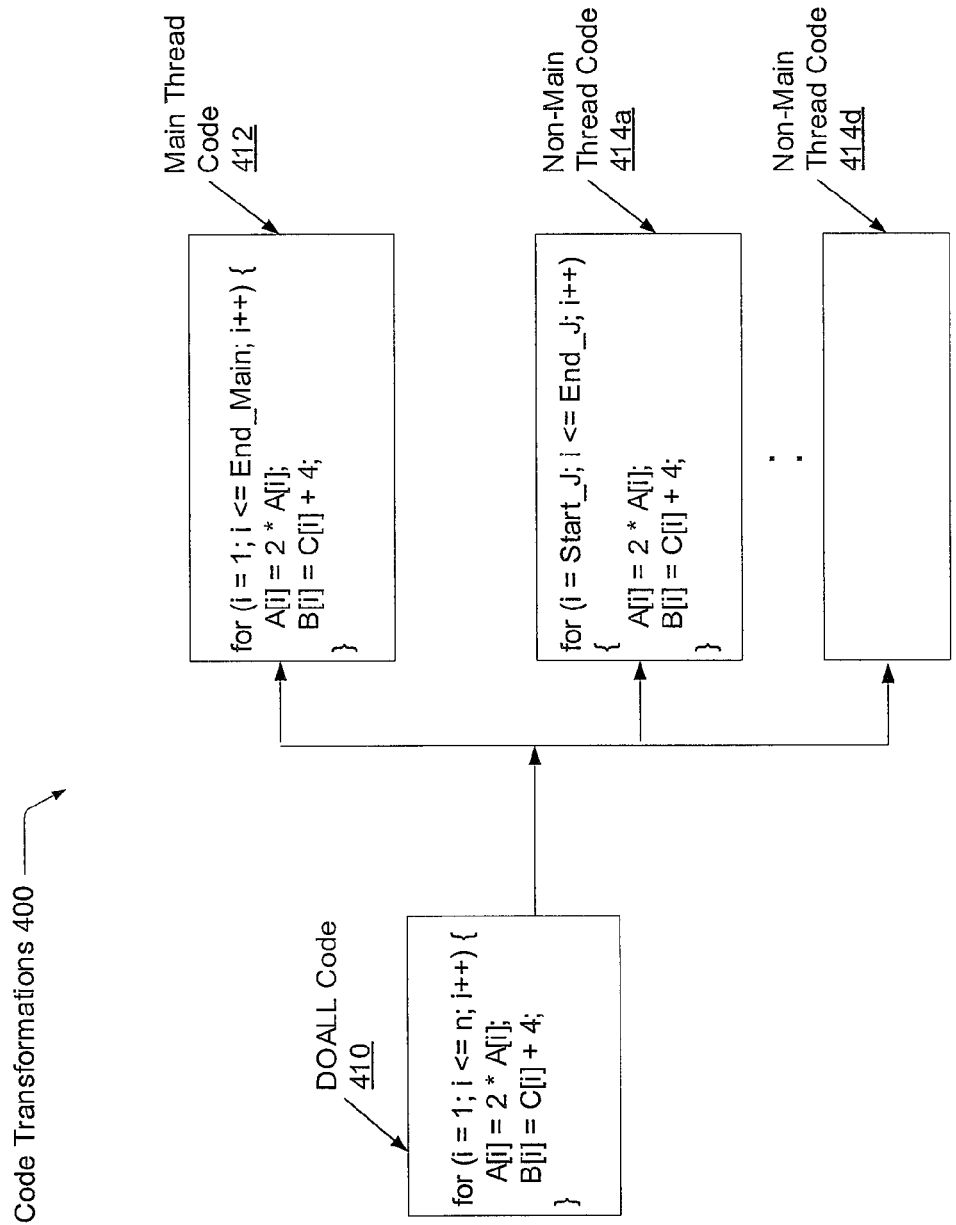
FIG. 4 is a generalized block diagram illustrating one embodiment of code transformations for a DOALL loop.

Turning now to FIG. 4, one embodiment of code transformations 400 for a DOALL loop is shown. Code 410 illustrates source code with no cross-iteration dependences in the loop. Each iteration of the loop only accesses the data in A[i], B[i], and C[i] for $1 \leq i \leq n$, wherein i and n are integers. This loop can be executed in fully parallel form, without synchronization, since the desired outcome of the loop does not depend upon the execution ordering of the data accesses from other different iterations. Code 412 demonstrates a main thread that executes a predetermined number of iterations beginning with a first iteration of i=1.

Code 414 illustrates one or more non-main threads that perform the same algorithm or method of the main thread, but for other iteration counts. In one embodiment, the original loop in code 410 may have its total iteration count simply divided by a predetermined constant, such as 10. If it is determined that code 410 has an iteration count of 1,000, then code 412 corresponding to the main thread may execute iterations 1 to 100, code 414a corresponding to a first non-main thread may execute iterations 101-200, code 414b (not shown) corresponding to a second non-main thread may execute iterations 201-300, and so forth.

Typically, automatic parallelization is implemented with a fork join model, wherein the original main thread, such as main thread code 412, forks a set of non-main threads, such as non-main thread code 414, in order that the work in a parallel loop will be shared among all threads. The thread management and partitioning of the work may often be processed in a separate parallelization library. A master function within a parallelization library may partition the original work among multiple threads, and also handle synchronization between different threads. The parallelization library may apply a scheduling policy, which is determined and passed in by the compiler, to partition work among multiple threads. There are many different scheduling policies. The most common scheduling policy is called "static" scheduling, which tries to distribute original work evenly across all threads.

For other loops not shown, if there are no flow dependences, but there are anti or output dependences, then the loop may be modified to remove all dependences before it can be executed in parallel. In order to remove certain types of anti and output dependences a transformation called privatization may be applied to the loop. Privatization creates for each non-main thread private copies of program variables that give rise to anti or output dependences. Examples may be found within D. Padua et al, Advanced compiler optimizations for supercomputers, Comm. ACM, December 1986, pp. 1184-1201 and Z. Li, Array privatization for parallel execution of loops, In Proceedings of the $19^{th}$ International Symposium on Computer Architecture, 1992, pp. 313-322.

Figure 5:
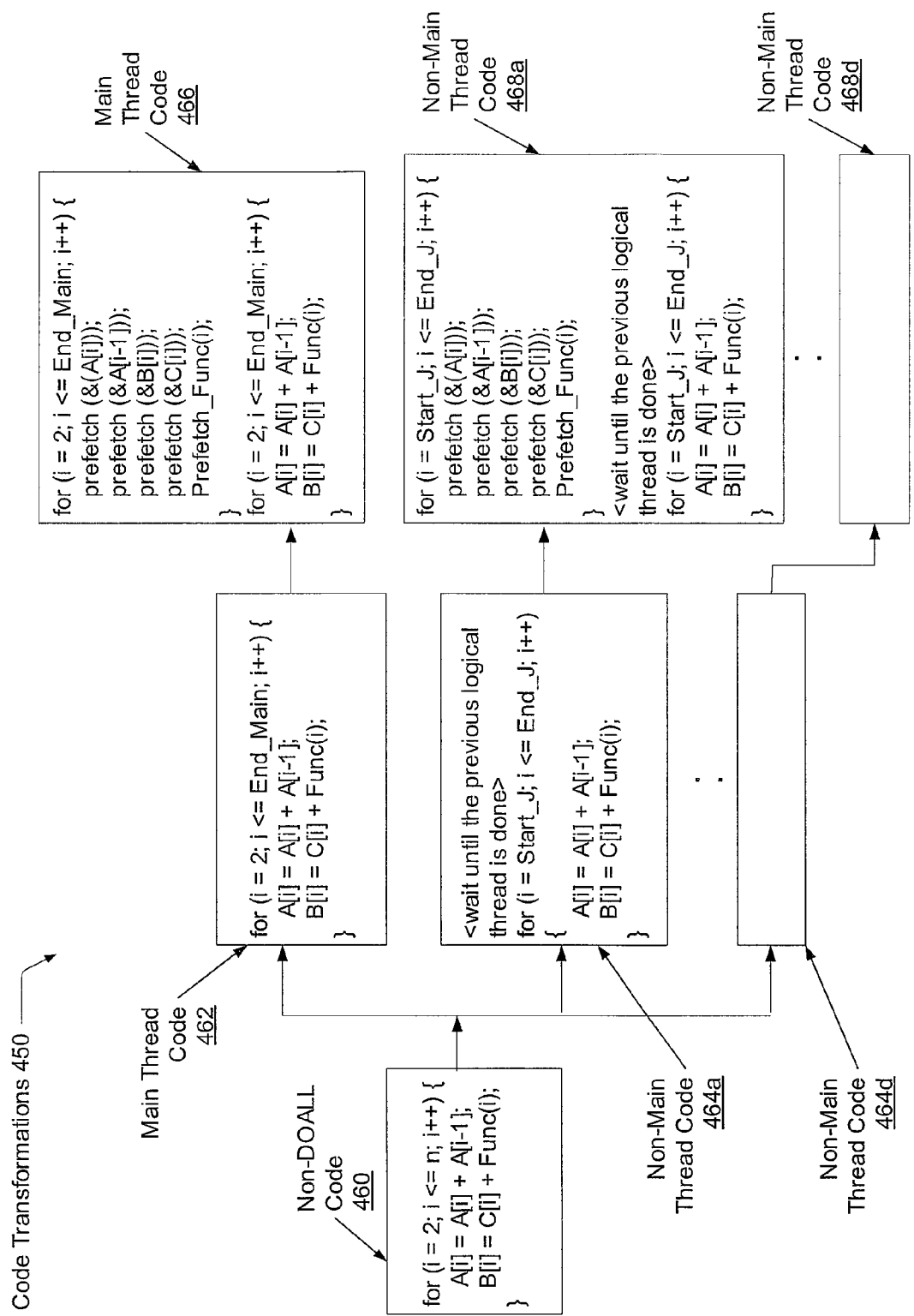
FIG. 5 is a generalized block diagram illustrating one embodiment of code transformations for a non-DOALL loop.

Referring now to FIG. 5, one embodiment of code transformations 450 for a non-DOALL loop is shown. Code 460 illustrates source code with cross-iteration dependences in the loop. For each iteration of the "for" construct loop, the first statement within the loop computes the prefix sums for an array A. These statements must be executed in order of iteration number because iteration i+1 uses a value that is produced in iteration i, for $2 \leq i \leq n$, wherein i and n are integers. Similarly, for each iteration of the loop, the second statement within the loop may be executed in order of iteration number because iteration i+1 may use a value produced in iteration i, for $2 \leq i \leq n$, wherein i and n are integers. This is because function call, Func(i), may use a value produced in a prior iteration. Even if the function call, Func(i), does not use a value produced in a prior iteration, the dependence analysis to prove the absence of dependence on a prior iteration number may be too complex and require too much processing time or resources to be practical. Therefore, without actually proving a dependence, a compiler may conservatively assume that a dependence exists within the function, Func(i). Then the loop must be executed in order of iteration number.

Rather than execute the non-DOALL code 460 in order of iteration number, traditional automatic parallelization tries, but fails, to parallelize non-DOALL loops. Hardware and/or software support for transactional memory has enabled active research on speculative automatic parallelization. The speculative part of the work may be enclosed in a transaction region through checkpoint/commit instructions. If there are any memory access violations at runtime, the transaction fails. The parallelization runtime can then either re-execute the speculative work, or wait until the previous logical thread finishes its work in order to execute the work in a non-speculative manner, such as in order of iteration number.

However, increased system performance may be obtained with much less complexity using non-speculative execution, such as execution in order of iteration number, with the additional improvements described shortly below.

Code 462 illustrates a main thread that executes a predetermined number of iterations beginning with a first iteration of i=2. Code 464 illustrates one or more non-main threads that perform the same algorithm or method of the main thread, but for other iteration counts.

Also, each non-main thread 464 may have a wait statement ahead of the loop instructions in order to maintain execution in order of iteration number across the threads. In one embodiment, a wait statement may comprise a read operation of a global variable that is written by the immediately previous thread in logical order. The immediately previous thread may write this global variable with a predetermined value upon completion of its operations. For example, a non-main thread 7 may write a global variable with a predetermined value upon completion of its operations. A non-main thread 8 may not begin execution of its operations until a read operation of this same global variable returns the predetermined value. This mechanism of utilizing a wait statement is one example of providing synchronization between the main thread and one or more non-main threads. Other synchronization mechanisms are possible and contemplated. Therefore, the original loop iteration order may be enforced via inter-thread synchronization.

Similar to the segmentation of the DOALL code 410, in one embodiment, the original loop in code 460 may have its total iteration count simply divided by a predetermined constant, such as 10. If it is determined that code 460 has an iteration count of 1,000, then code 462 corresponding to the main thread may execute iterations 2 to 100, code 464a corresponding to a first non-main thread may execute iterations 101-200, code 464b (not shown) corresponding to a second non-main thread may execute iterations 201-300, and so forth.

During analysis of the statements within the loop, the compiler may use well known helper threading program slicing techniques to place code ahead of the loop execution statements as shown in main thread code 466. These additional statements may perform address calculations for load and store operations, data cache prefetching, early branch prediction resolution, and other. Some important differences exist, however, between traditional helper threading program slicing and the preparatory code that can be used in the techniques described here. By allowing the same logical thread to execute both the preparatory work and the actual non-speculative work, thread state can be shared across these pieces. For example, the value of a complex expression may be computed and stored in a register in the preparatory code and directly used from said register in the non-speculative work. Similarly, prefetch variants may be used that bring the data even closer to the processor. For example, data may be brought all the way to the level 1 cache as opposed to the nearest cache shared by the helper and main thread. Such enhancements to helper thread program slicing techniques are permitted by the invention described here and are contemplated. These additional steps may prevent the loop execution statements from waiting for input values, experiencing memory latency, waiting for branch resolution, and other. In one embodiment, the function, Prefetch_Func(i), may be a cloned version of Func (i), wherein enhanced helper threading program slicing is applied to the function body.

As is well known in the art, typically, the additional statements generated by helper threading program slicing are placed in a single separate thread, a helper thread. The single helper thread may aid the statements of the function body of a main thread only, and not aid the non-main helper threads. In contrast, as seen in FIG. 5, the additional statements generated by helper threading program slicing are placed within the main thread code 466 and not in a separate thread. Also, additional statements, for example, code for synchronization and statements that use non-speculative, dependence free operations to compute values that may be used by the same thread when doing later non-speculative work, are placed within each of the non-main thread codes 468.

No speculation may be used with codes 466 and 468 of FIG. 5. The original loop iteration order may be enforced via inter-thread synchronization. Similar to the main thread code 466, each non-main thread code 468 may prefetch data to its local cache before executing the loop body assigned for that thread. The execution of the additional statements of a given non-main thread i may overlap with or complete before the execution of the loop body statements of a previous non-main thread i-1. Later, when the loop body statements of the given non-main thread i are executed, the memory accesses may be cache hits instead of cache misses, and execution time of the non-main thread may be reduced.

It is noted that data dependences may exist between the additional statements generated by enhanced helper threading program slicing and placed in the main thread code 466 and the non-main thread code 468. In such a case, additional inter-thread synchronization techniques may be added to these additional statements in order to provide pipelined execution of threads. Examples and a further description are provided shortly below. In the case of no data dependences on the additional statements placed in the main thread code 466, the placement of the statements may change. In such a case, in another embodiment, rather than place these additional statements in a loop ahead of the loop execution statements, these additional statements may be placed within the loop of the loop execution statements. Placing the additional statements within the loop of the execution statements may be more cost effective.

Compiler techniques for estimating execution time such as for loop body statements are well known in the art. In one embodiment, if the compiler determines the execution time for the helping additional statements is greater than for the loop body statements, then the compiler may choose one of several options. A first option is, within the additional statements, perform periodic checks to determine whether the previous thread has completed or not. If the previous thread has completed, the additional statements may simply stop execution and allow the execution of the loop body statements to begin. A second option is to further divide and segregate the additional statements into several loops. A first loop may compute an input value for a next thread. A second loop may perform prefetching and other warmup operations for the current thread. The purpose may be to create more execution overlapping between adjacent threads in order that overall execution time may be reduced. In this manner, the penalty for the pipelined original non-speculative code execution is minimized.

In the above example, the non-DOALL code 460 is a countable loop. A loop with an iteration count that can be determined by a compiler or calculated at execution time before the loop is executed and has an unchanging loop index is a countable loop. In another example, code 460 may include straight-line code comprising two or more function calls, such as routine_1(args_list1), routine_2(args_list2), routine_3(args_list3), and so forth. A parallelization library may assign the execution of routine_1 to a main thread, the execution of routine_2 to a first non-main thread, the execution of routine_3 to a second non-main thread, and so forth. In addition, the main thread and each of the non-main threads may have helper additional statements generated and inserted ahead of each respective routine body of statements. Here the work is divided based upon the function calls.

In addition, it is possible and contemplated to consider other parallel regions as a basis for division, such as code within other loop constructs, code within a user-specified directive such as an OpenMP pragma, code within a first function call with no data dependencies on a second function call, and a first basic block with no data dependencies on a second basic block. Regarding the size of a segment to be executed by a main thread or a non-main thread, one method for segmentation may include estimating the total data volume accessed by one segment and ensure this amount is less than the size of a level-one (L1) cache. Therefore, a segment's size may be both large enough to amortize the cost of the pipelined parallelization and small enough to benefit from cache prefetching performed by the additional helper statements.

In FIG. 5, no data dependences for the helper additional statements between adjacent logical non-main threads are shown. However, if such data dependences do exist, then the compiler may apply additional techniques as described shortly below.

Figure 6:
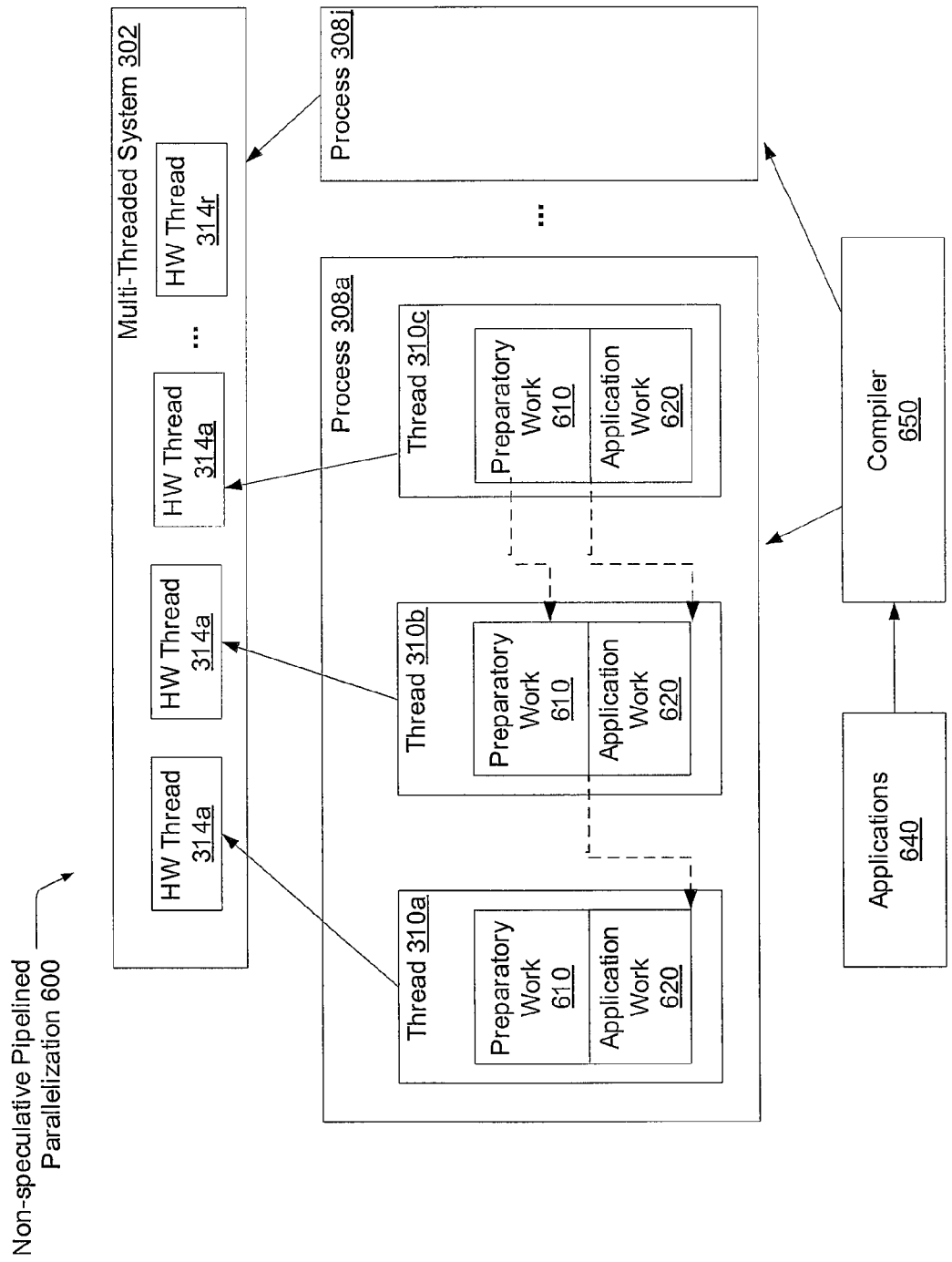
FIG. 6 is a generalized block diagram illustrating one embodiment of non-speculative pipelined parallelization of non-DOALL loops with helper threading.

Referring now to FIG. 6, one embodiment of non-speculative pipelined parallelization 600 of non-DOALL loops with helper threading is shown. Compiler 650 compiles one or more software applications 640. A parallelization library utilized by the compiler 650 may be used to partition a non-DOALL parallel region within applications 640 into the software threads 310 of a process 308. The parallelization library may be used to parallelize the region, or partition data, such as iteration numbers, of the region, and then distribute a different subset of data onto software threads. For the example of loop constructs, each software thread may be assigned the same function, or algorithmic instructions, of the region to be executed with different data.

In one embodiment, additional statements generated by enhanced helper threading program slicing techniques may be inserted into each thread 310. These helper additional statements may be represented by preparatory work 610. The main body statements of a detected parallel region may be represented by application work 620. The main body statements may also be referred to as the algorithmic instructions, since these are the instructions written by a designer to perform a predetermined algorithm or method. A kernel (not shown) may perform the assignments of software threads 310 to hardware threads 314 within a multi-threaded system 302.

In one embodiment, threads 310 for a non-DOALL parallel region are executed non-speculatively. Therefore, inter-thread synchronization statements are included to ensure in program order execution. The dashed line between the top of application work 620 of thread 310b and the bottom of application work 620 of thread 310a represents this inter-thread dependence and synchronization. Also, there may be data dependences between a preparatory work 610 section of a non-main thread and either a preparatory work section 620 or an application work section 620 of a previous logical non-main thread. Therefore, inter-thread synchronization statements are included to ensure in program order execution. A similar protocol may be used with a write and a read of a global variable as discussed earlier. The dashed line between the preparatory work section 610 of thread 310c and the preparatory work section 610 of thread 310b represents this inter-thread dependence and synchronization.

Turning now to FIG. 7A, one embodiment of code examples of inter-thread dependences 700 is shown. Code 710 illustrates a code example wherein value prediction may reduce an inter-thread dependence. The value of a particular variable may be determined to be highly predictable if a future iteration value for this particular variable can be calculated with a high confidence using both the current iteration's value and the loop index. Regarding code 710, through profiling or static analysis, a compiler may find the condition expression for the IF statement to be rarely true. Therefore, the compiler may determine the statements within the IF statement construct are rarely executed and the value for the variable k is highly predictable.

A probability threshold may be used to decide whether a value of a variable is highly predictable or the variable value should not be determined at compile time. Such a threshold value may be a fixed empirical value, or it may be calculated differently based on the penalty of a misprediction. For example, if a misprediction penalty greatly reduces or eliminates the benefit of prefetching, then the compiler may use 100% probability value as the threshold. In one embodiment, when a 100% threshold is not reached, the actual computed initial value may be used again. Therefore, a prediction may be used for a predetermined number of iterations, and afterward, the actual computed initial value is utilized.

If the rate of the value prediction does not reach a predetermined threshold, a non-main thread "j" may only execute its corresponding preparatory work section 610 after the immediately previous logical thread "j-1" both has completed its corresponding preparatory work section 610 and has finished a computation of input values for the non-main thread "j". Code 720 illustrates an example of these two synchronization locations with the wait sections within the code. The waiting or synchronization attempts to overlap the execution of the application work section 620 of the previous thread "j-1" and the execution of the preparatory work section 610 of the current non-main thread "j". In one embodiment, the kernel 312 may only use two hardware threads for the execution of a group of three software threads following this example. For example, a third logical non-main thread "j+1" may reuse the hardware thread of the first logical thread "j-1".

Again, compiler techniques for estimating execution time are well known in the art. In the above example regarding code 720, the compiler may estimate the execution time for the preparatory work section 610 is less than the execution time of the application work section 620. However, if the compiler estimates the execution time for the preparatory work section 610 is greater than the execution time of the application work section 620, then there may be a runtime gap of no work that reduces system performance. This gap may be between the preparatory work section 610 and the application work section 620 of a same non-main thread that is transformed as shown in code 720. Therefore, another approach may be used in this situation as described below.

Turning now to FIG. 7B, another embodiment of code examples of inter-thread dependences 750 is shown. Code 752a-752b illustrate a transformed code example to increase performance for a particular situation. This particular situation may be when a value for a variable has both inter-thread dependence and is not highly predictable. In addition, the compiler may estimate the execution time for the preparatory work section 610 is greater than the execution time of the application work section 620. For this situation, the compiler may re-compute the input values to be used by an application work section 620 of a current thread ("j") by copying and executing a portion of the application work section 620 of the previous thread ("j−1") within the preparatory work section 610 of the current thread ("j"). Since the re-computation time is less than the execution time of the application work section 620 there will be no waiting gap between the executions of two adjacent threads.

Code 752a-752b corresponds to the re-computation described above and has several synchronization points. First, the non-main thread "j" may wait until the thread "j−1" has the input value "k" in order that the non-main thread "j" may compute its own input value "k". Afterward, the non-main thread "j" signals the availability of its input value "k" to the non-main thread "j+1". Then the non-main thread "j" may begin execution of its preparatory work section 610 and its application work section 620.

After the non-main thread "j" signals the non-main thread "j+1" that the input value "k" is available, in order to complete its work, the non-main thread "j" may consume the sum of the execution times of the preparatory work section 610 and the application work section 620. Simultaneously, the non-main thread "j+1" may consume the sum of the execution times of the re-computation and the preparatory work section 610, and then it may wait for the application work section 620 of non-main thread "j" to complete. If the re-computation consumes less time than the application work section 620, then the non-main thread "j+1" may wait for the non-main thread "j" to complete its application work section 620. Hence, once the non-main thread "j" completes its application work section 620, the non-main thread "j+1" may immediately begin execution of its application work section 620 without any waiting gap at runtime.

In most cases, it is believed the re-computation time consumes less time than the execution time of the application work section 620. However, in certain cases wherein a loop for re-computation comprises too many load operations, and wherein these load operations are predicted to be cache misses, the re-computation may consume more time than the execution time of the application work section 620. The reason for the greater execution time may be due to these load operations that are predicted to be cache hits in the application work section 620. In this case of greater execution time for the re-computation, a corresponding loop may not be considered as a candidate for the code transformations shown in FIG. 5 and FIG. 7A-7B used for pipelined parallelization with self-helper threading.

It is noted that generally a qualified loop with a "while" construct may be transformed as shown in codes 720 and 752-752b by adding an artificial iteration counter to transform the loop from a "while" construct to a "for" construct. A possible break branch instruction may be added inside the loop body to terminate the loop if the condition expression for the "while" construct is not satisfied.

It is noted that similar to the above particular situation, another situation may occur when it may be needed for the compiler to re-compute the input values to be used by an application work section 620 of a subsequent thread ("j+1") by copying and executing a portion of the application work section 620 of the current thread ("j") within the preparatory work section 610 of the current thread ("j"). Other combinations of data dependences between adjacent thread iterations, in addition to data dependences across other iterations, such as between iteration number "j−2" and "j", are possible and contemplated. Similar code transformations as shown in FIG. 5 and FIG. 7A-7B may be applied by the compiler to handle these other combinations.

Figure 8:
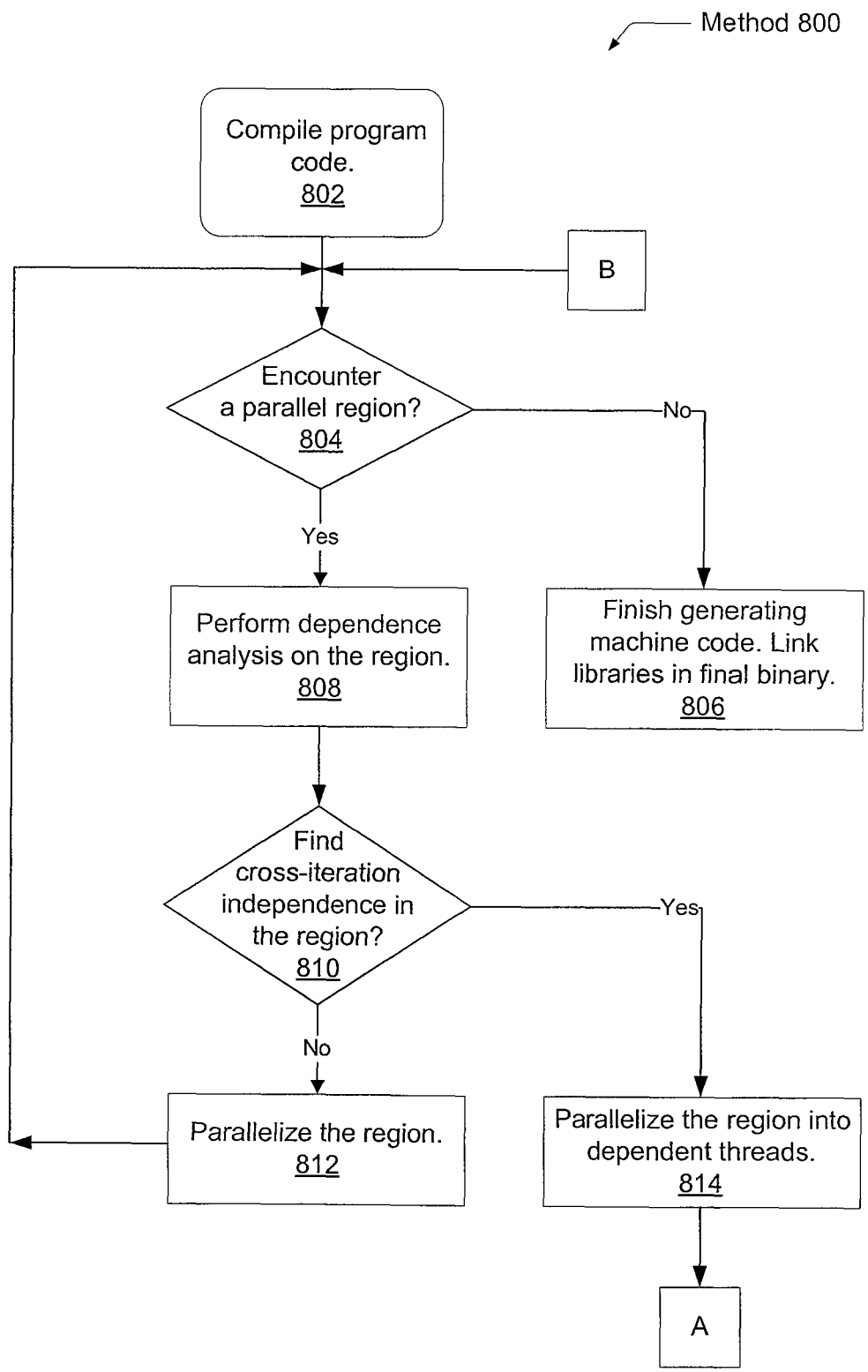
FIG. 8 is a flow diagram illustrating one embodiment of a method for automatically parallelizing a computer program for simultaneous execution using multiple threads.

Turning now to FIG. 8, one embodiment of a method 800 for automatically parallelizing a computer program for multi-threaded execution is shown. Method 800 may be modified by those skilled in the art in order to derive alternative embodiments. Also, the steps in this embodiment are shown in sequential order. However, some steps may occur in a different order than shown, some steps may be performed concurrently, some steps may be combined with other steps, and some steps may be absent in another embodiment. In the embodiment shown, source code has been translated and optimized by a front-end compilation and the respective lower-level representation has been conveyed to a back-end compiler in block 802.

A parallel region may be placed in the program code and subsequently encountered or identified during compilation (conditional block 804). Identifying a parallel region may comprise detecting one or more of the following: a "for" or "while" loop construct, a user-specified directive such as an OpenMP pragma, a first function call with no data dependencies on a second function call, and a first basic block with no data dependencies on a second basic block. If a parallel region is not identified, then in block 806, the corresponding code style is translated to binary machine code and function calls defined in libraries, such as the parallelization library, are included in the binary. Otherwise, in block 808, a dependence analysis is performed on the identified parallel region.

If the parallel region is determined to be cross-iteration independent (conditional block 810), then in block 812, the parallel region is parallelized into separate threads. Modern automatic parallelization techniques parallelize a loop construct if the compiler is certain that all loop iterations can be executed simultaneously. These identified DOALL loops can be executed in fully parallel form, without synchronization, since the desired outcome of the loop does not depend upon the execution ordering of the data accesses from other different iterations. Then control flow of method 800 returns to block 804.

If a parallel region is determined to be a non-DOALL type (conditional block 810), then in block 814, the region is parallelized into separate threads despite the cross-iteration dependences. Depending on the type of parallel region, the parallelization may be based upon a total iteration count, a function call, or other. Then control flow of method 800 moves to block A.

Figure 9:
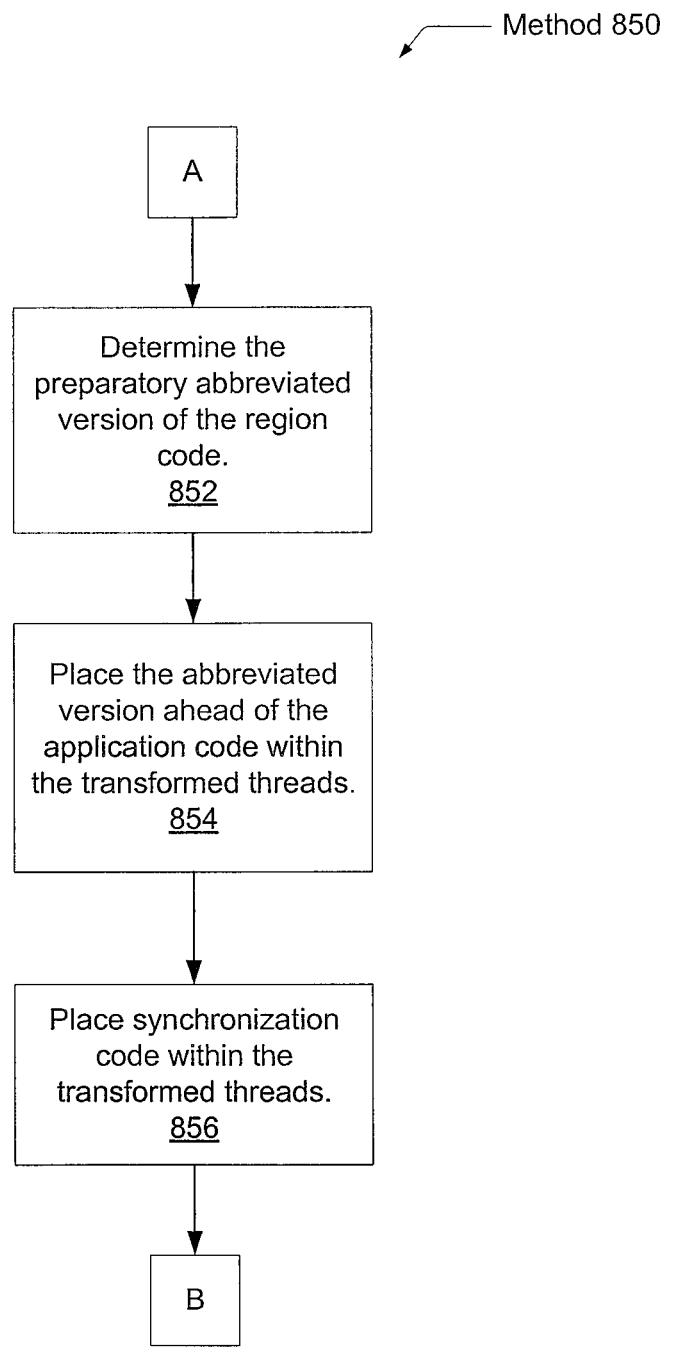
FIG. 9 is a flow diagram illustrating one embodiment of a method for continuing automatically parallelizing a computer program for simultaneous execution using multiple threads.

Turning now to FIG. 9, one embodiment of a method 850 for continuing automatically parallelizing a computer program for multi-threaded execution is shown. Method 850 may be modified by those skilled in the art in order to derive alternative embodiments. Also, the steps in this embodiment are shown in sequential order. However, some steps may occur in a different order than shown, some steps may be performed concurrently, some steps may be combined with other steps, and some steps may be absent in another embodiment. In the embodiment shown, block A is reached after a non-DOALL parallel region with cross-iteration dependences is found and divided into segments. In one embodiment, these segments are each assigned to a software thread 310. A main thread and one or more non-main threads may utilized for the execution of the non-DOALL parallel region.

In block 852, a compiler may use enhanced helper threading program slicing techniques to determine code that is a preparatory abbreviated version of the parallel execution statements, such as statements within a loop body. These additional statements may perform address calculations, cache prefetching, early branch prediction resolution, and other. In block 854, these additional statements are placed ahead of the application code. Both FIG. 5 and FIG. 6 illustrate the placement of these additional statements. In block 856, synchronization statements are placed within the non-main threads. In one embodiment, write and read operations to a predetermined global variable may be used for synchronization. Synchronization statements may be used to ensure execution of the application work section 620 of each thread 310 in order of iteration number, in order of function call, or other. In addition, synchronization statements may be inserted into the preparatory work sections 610 according to the descriptions above regarding FIG. 7A and FIG. 7B. Then control flow of method 850 moves to block B.

Figure 10:
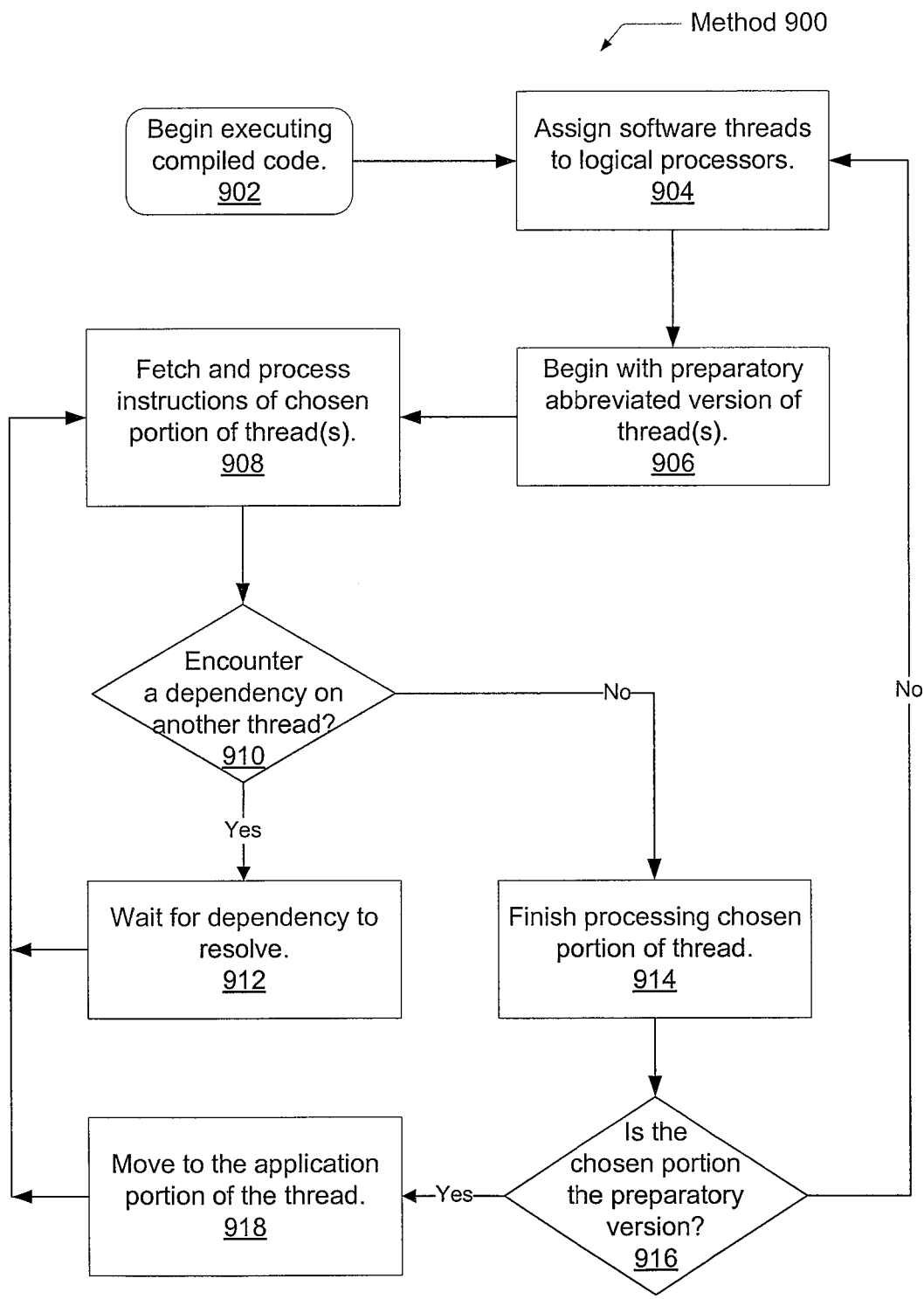
FIG. 10 is a flow diagram illustrating one embodiment of a method for execution of a computer program using multiple-threads.

Referring now to FIG. 10, one embodiment of a method 900 for multi-threaded execution of a computer program is shown. Method 900 may be modified by those skilled in the art in order to derive alternative embodiments. Also, the steps in this embodiment are shown in sequential order. However, some steps may occur in a different order than shown, some steps may be performed concurrently, some steps may be combined with other steps, and some steps may be absent in another embodiment. In the embodiment shown, source code with detected non-DOALL parallel regions, such as loop constructs, has been compiled, transformed for pipelined parallelization with self-helper threading, and execution of the code has begun in block 902. The transformed code may correspond to style formats shown in FIG. 5, FIG. 6, FIG. 7A, and FIG. 7B.

In block 904, a kernel 312 assigns software threads 310 to hardware threads 314 of a multi-threaded system 302. Each of the main and one or more non-main threads assigned to hardware threads may simultaneously begin execution in block 906. The preparatory work sections 610 of each assigned thread may simultaneously begin execution. In block 908, instructions of a chosen portion of the assigned threads are fetched and processed. In one embodiment, possible portions of the assigned threads include the preparatory work sections 610 and application work sections 620. Initially, the chosen portions are the preparatory work sections 620.

During execution of a chosen portion of a thread, if a dependency on another thread is encountered (conditional block 910), then in block 912, placed synchronization statements cause the current thread to wait until the dependency is resolved. Then control flow of method 900 returns to block 908. Otherwise, if a dependency on another thread is not encountered (conditional block 910), then in block 914, the chosen portion of the thread has the remainder of its instructions fetched and executed.

If the chosen portion of the thread is the preparatory work section 610 (conditional block 916), which is the initial case, then in block 918, processing of the thread moves to the application work section 620. However, a placed synchronization statement may cause the thread to wait to continue processing instructions until the application work section 620 of a previous thread has completed. Then control flow of method 900 returns to block 908 with the application work section 620 as the chosen portion of the thread. If the chosen portion of the thread is the application work section 620 (conditional block 916), then the current thread has completed its operations and control flow of method 900 returns to block 904.

Various embodiments may further include receiving, sending or storing instructions and/or data implemented in accordance with the above description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc.

Although the embodiments above have been described in considerable detail, to numerous variations and modifications will become apparent to those skilled in the art once the above disclosure is fully appreciated. It is intended that the following claims be interpreted to embrace all such variations and modifications.

What is claimed is:

1. A non-transitory computer readable storage medium storing program instructions, wherein the program instructions are executable to:
   identify a parallel region with cross-iteration dependences within program instructions of a computer program;
   parallelize the parallel region into a plurality of threads, wherein each of said threads comprises a same set of algorithmic instructions;
   generate helper thread instructions based at least in part on the algorithmic instructions;
   insert the helper thread instructions in each of the plurality of threads;
   insert synchronization instructions in one or more of the plurality of threads, wherein the synchronization instructions are configured to cause execution of the algorithmic instructions of each of the plurality of threads to occur in program order with respect to each other thread of the plurality of threads;
   determine that a first instruction of the helper thread instructions is dependent upon a second instruction of the helper thread instructions; and
   set a next output of the second instruction to have a same value as that of a previous output of the second instruction in response to predicting that the second instruction will not be executed.

2. The storage medium as recited in claim 1, wherein the program instructions are further executable to insert the helper thread instructions ahead of the algorithmic instructions within each of the plurality of threads, and wherein the helper thread instructions are configured to begin simultaneous execution with respect to each other thread of the plurality of threads.

3. The storage medium as recited in claim 2, wherein the program instructions are further executable to determine a first instruction of the helper thread instructions is dependent upon a second instruction of the helper thread instructions of a previous logical thread of the plurality of threads.

4. The storage medium as recited in claim 3, wherein the program instructions are further executable to insert a synchronization instruction ahead of said first instruction configured to halt execution of said first instruction until said second instruction completes, in response to said determination.

5. The storage medium as recited in claim 3, wherein in response to determining a total execution time of the helper thread instructions is greater than a total execution time of the algorithmic instructions, the program instructions are further executable to insert instructions ahead of the helper thread instructions configured to:
   halt execution of the helper thread instructions until initial values used to compute an output of said second instruction are indicated as ready from a previous logical thread of the plurality of threads;
   compute a next output of said second instruction using the ready initial values, and convey said next output to the first instruction; and
   convey an indication that an output of said second instruction is ready to a subsequent logical thread of the plurality of threads.

6. The storage medium as recited in claim 3, wherein the program instructions are further executable to set a next output of said second instruction to have a same value as that of a previous output of the second instruction immediately before a conditional expression, in response to predicting the second instruction will not be executed.

7. The storage medium as recited in claim 2, wherein said helper thread instructions may perform at least one of the following: address calculations for load and store operations, data cache prefetching, and early branch prediction resolution.

8. The storage medium as recited in claim 2, wherein identifying a parallel region comprises detecting one or more of the following: a loop construct instruction, a user-specified directive, a first function call with no data dependencies on a second function call, and a first basic block with no data dependencies on a second basic block.

9. A compilation method for automatically parallelizing a computer program executable by a processor comprising:
   identifying a parallel region with cross-iteration dependences within program instructions of a computer program;
   parallelizing the parallel region into a plurality of threads, wherein each thread comprises a same set of algorithmic instructions;
   generating helper thread instructions based at least in part on the algorithmic instructions;
   inserting the helper thread instructions in each of the plurality of threads; and
   inserting synchronization instructions in one or more of the plurality of threads, wherein the synchronization instructions are configured to cause execution of the algorithmic instructions of each of the plurality of threads to occur in program order with respect to each other thread of the plurality of threads;
   determining that a first instruction of the helper thread instructions is dependent upon a second instruction of the helper thread instructions; and
   setting a next output of the second instruction to have a same value as that of a previous output of the second instruction in response to predicting that the second instruction will not be executed.

10. The method as recited in claim 9, further comprising inserting the helper thread instructions ahead of the algorithmic instructions within each of the plurality of threads, and wherein the helper thread instructions are configured to begin simultaneous execution with respect to each other thread of the plurality of threads.

11. The method as recited in claim 10, further comprising determining a first instruction of the helper thread instructions is dependent upon a second instruction of the helper thread instructions of a previous logical thread of the plurality of threads.

12. The method as recited in claim 11, further comprising, in response to said determination, inserting a synchronization instruction ahead of said first instruction configured to halt execution of said first instruction until said second instruction completes.

13. The method as recited in claim 11, in response to determining a total execution time of the helper thread instructions is greater than a total execution time of the algorithmic instructions, further comprising:
   halting execution of the helper thread instructions until initial values used to compute an output of said second instruction are indicated as ready from a previous logical thread of the plurality of threads;
   computing a next output of said second instruction using the ready initial values; and
   conveying an indication that an output of said second instruction is ready to a subsequent logical thread of the plurality of threads.

14. The method as recited in claim 11, further comprising setting a next output of said second instruction to have a same value as that of a previous output of the second instruction immediately before a conditional expression, in response to predicting the second instruction will not be executed.

15. The method as recited in claim 10, wherein said helper thread instructions may perform at least one of the following: address calculations for load and store operations, data cache prefetching, and early branch prediction resolution.

16. The method as recited in claim 10, wherein identifying a parallel region comprises detecting one or more of the following: a loop construct instruction, a user-specified directive, a first function call with no data dependencies on a second function call, and a first basic block with no data dependencies on a second basic block.

17. A compiler comprising:
   a processor; a memory coupled to the processor;
   code generation instructions stored in the memory and executed by the processor; and
   optimization instructions stored in the memory and executed by the processor, the optimization instructions configured to:
      identify a parallel region with cross-iteration dependences within program instructions of a computer program;
      parallelize the parallel region into a plurality of threads, wherein each thread comprises a same set of algorithmic instructions; and
      determine helper thread instructions based upon the algorithmic instructions; and
   wherein the code generation instructions are configured to:
      insert the helper thread instructions in each of the plurality of threads; and
      insert synchronization instructions in one or more of the plurality of threads, wherein the synchronization instructions are configured to cause execution of the algorithmic instructions of each of the plurality of threads to occur in program order with respect to each other thread of the plurality of threads; and
   wherein the optimization instructions are further configured to:
      determine that a first instruction of the helper thread instructions is dependent upon a second instruction of the helper thread instructions; and
      to set a next output of said second instruction to have a same value as that of a previous output of the second instruction in response to predicting that the second instruction will not be executed.

18. The compiler as recited in claim 17, wherein the code generation instructions are further configured to insert the helper thread instructions ahead of the algorithmic instructions within each of the plurality of threads, and wherein the helper thread instructions are configured to begin simultaneous execution with respect to each other thread of the plurality of threads.

19. The compiler as recited in claim 18, wherein the optimization instructions are further configured to determine a first instruction of the helper thread instructions is dependent upon a second instruction of the helper thread instructions of a previous logical thread of the plurality of threads.

20. The compiler as recited in claim 19, wherein the optimization instructions are further executable to, in response to said determination, insert a synchronization instruction ahead of said first instruction configured to halt execution of said first instruction until said second instruction completes.

* * * * *